United States Patent [19]

Porter et al.

[11] Patent Number: 4,576,620
[45] Date of Patent: Mar. 18, 1986

[54] APPARATUS FOR THE PRODUCTION OF MINERAL FIBERS HAVING SUPPLEMENTAL COLLECTION CHAMBER EXHAUST

[75] Inventors: William F. Porter, Lake Zurich; Michael J. Porter, Hanover Park; Dwight E. Johnson, Villa Park, all of Ill.

[73] Assignee: United States Gypsum Company, Chicago, Ill.

[21] Appl. No.: 677,728

[22] Filed: Dec. 4, 1984

[51] Int. Cl.⁴ .............................................. C03B 37/06
[52] U.S. Cl. .............................................. 65/9; 65/10; 65/14
[58] Field of Search ........................ 65/9, 10, 14, 16, 5; 209/30, 147, 922

[56] References Cited

U.S. PATENT DOCUMENTS

| | | | |
|---|---|---|---|
| 2,016,401 | 10/1935 | Thomas | 65/9 X |
| 2,450,511 | 10/1948 | Harner et al. | 65/9 X |
| 3,442,633 | 5/1969 | Perry | 65/16 X |
| 3,883,334 | 5/1975 | Cassidy et al. | 65/9 X |
| 4,230,471 | 10/1980 | Levecque et al. | 65/16 X |

Primary Examiner—Robert Lindsay
Attorney, Agent, or Firm—Samuel Kurlandsky; Robert M. Didrick; Robert H. Robinson

[57] ABSTRACT

An apparatus for the production and collation of mineral fibers, comprising an air fiberization apparatus for generating mineral fibers, a collection chamber for collecting the fibers produced, and a cyclone type air exhaust apparatus connected by a duct to an upper portion of the collection chamber, the exhaust apparatus reducing the air pressure generated within the collection chamber thereby increasing the efficiency of fiber collection, and means for returning mineral fibers escaping from the collection chamber through the cyclone exhaust apparatus to the main fiber discharge position.

4 Claims, 2 Drawing Figures

APPARATUS FOR THE PRODUCTION OF MINERAL FIBERS HAVING SUPPLEMENTAL COLLECTION CHAMBER EXHAUST

BACKGROUND OF THE INVENTION

1. Field of the Invention

The present invention relates to an apparatus for producing mineral fibers, and more particularly refers to such an apparatus having an improved and more efficient collection apparatus.

2. Description of the Prior Art

It is conventional in the prior art to produce mineral fibers by conveying a stream of molten mineral material such as glass or slag onto a rotating surface where the molten material is centrifuged into the path of an air stream to form the fibers. This is disclosed in U.S. Pat. Nos. 4,106,921 and 4,342,582. It has been found that, in operation, as the fiberization rate is increased in order to increase production, blowback results and the temperature within the collection chamber increases, making it difficult to exhaust air through the bottom of the collection chamber floor. This results in a reduction in the efficiency of the apparatus and a reduction in the output per unit time.

SUMMARY OF THE INVENTION

It is accordingly an object of the present invention to provide an apparatus for producing and collecting of mineral fiber which is more efficient than that of existing methods and apparatus. It is further an object of the invention to provide a means for increasing the rate of operation of the mineral fiber producing apparatus. It is still further an object of the invention to provide an apparatus and process whereby production costs are reduced.

Other objects and advantages of the invention will become apparent upon reference to the drawing and details of the description.

According to the invention an apparatus for the fiberization of mineral fibers is provided which introduces the formed fibers into a collection chamber. The ceiling of the collection chamber is connected to an exhaust means such as a cyclone apparatus for removing some of the air and fibers from the collection chamber, thereby reducing the pressure within the chamber and increasing the rate and efficiency of operation. Additionally, means is provided for returning the mineral fibers which escape through the exhaust system to the situs of the primary fiber discharge from the collection chamber.

DESCRIPTION OF THE PREFERRED EMBODIMENTS

Figure 1:
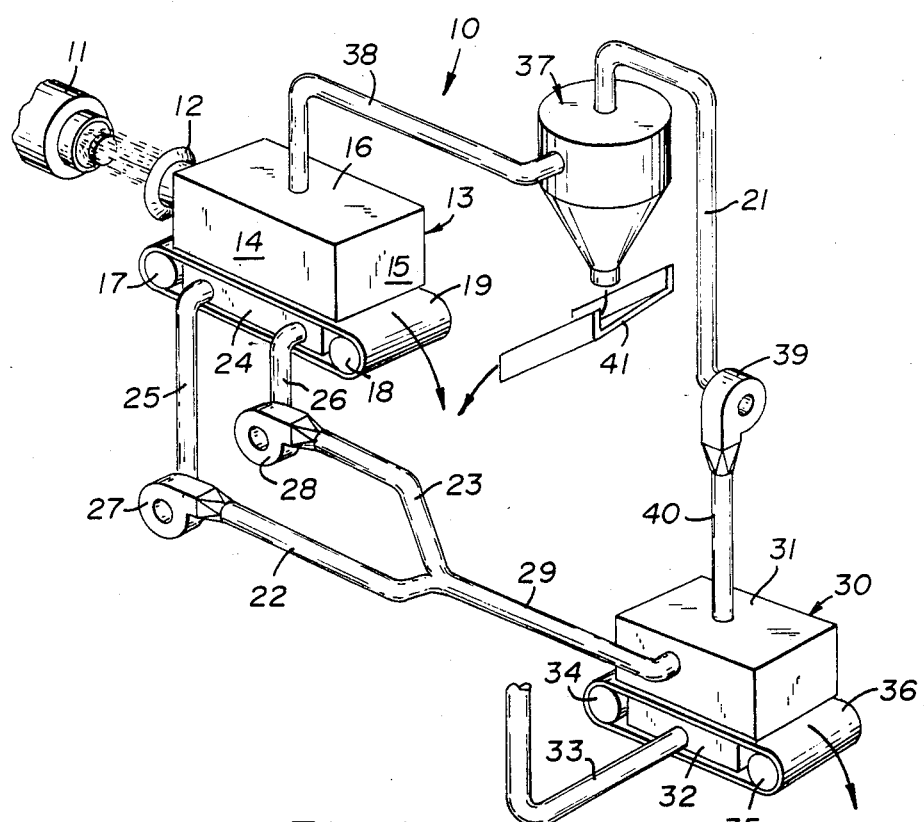
FIG. 1 is a perspective view of an apparatus according to the invention.

Referring to FIG. 1, the apparatus 10 is shown comprising an air fiberizer apparatus 11. This is disclosed and claimed in U.S. Pat. Nos. 4,106,921 and 4,342,582. Mineral fibers formed by the fiberizer 11 are blown into an influent duct 12 and into a collection chamber 13. The collection chamber is formed of two sidewalls 14, two end walls 15 and a top wall 16. Rotatably mounted rollers 17 and 18 are mounted below the collection chamber 13 and have a foraminous endless belt 19 mounted thereover. Mounted inside the belt 19 is a plenum 24 for collecting the air from the collection chamber. A pair of effluent air ducts 25 and 26 having exhaust fans 27 and 28, respectively, are connected in the trains of the effluent air ducts. Air ducts 22 and 23 conduct air to a combined flow duct 29 which is connected to an air filter 30 having a rectangular housing 31. An air plenum 32 is mounted below the housing 31. A pair of rollers 34 and 35 driven by an electric motor (not shown) has a foraminous belt 36 mounted thereon. An effluent duct 33 is connected to the plenum 32 of the air filter.

In order to facilitate the exhausting of the air from the collection chamber by reducing pressure therein, a collection chamber exhaust duct 38 is provided and has one end connected to a cyclone chamber exhaust duct 21 which leads from the top of the cyclone exhaust to an exhaust fan 39 which has a duct 40 connected to the top of the air filter housing 31. An inclined fiber transport chute or slide 41 is provided to return mineral fibers falling from the cyclone mixing apparatus 37 to the area where fibers discharge from the collection chamber are deposited.

Figure 2:
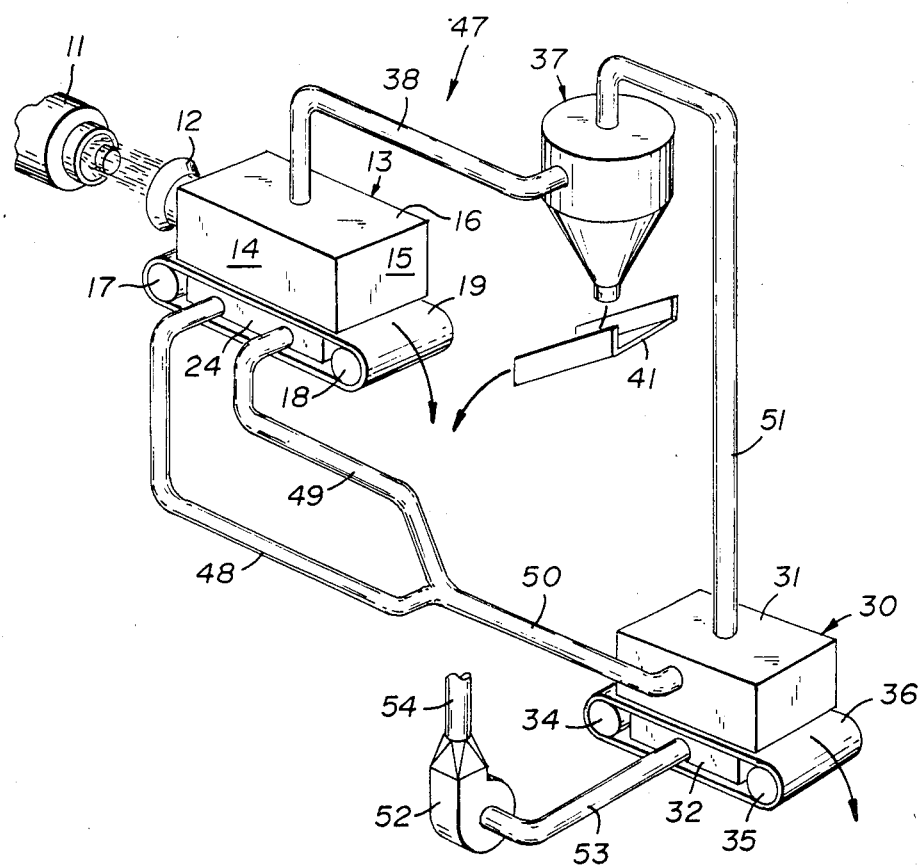
FIG. 2 is a perspective view of a somewhat modified embodiment.

Referring to FIG. 2, a somewhat modified apparatus 47 is shown which is generally similar to that shown in FIG. 1 and described above. In this embodiment, however, effluent ducts 48 and 49 do not have an exhaust fan, but merge to a common duct 50 which directly connects to the air filter housing 31. Additionally, the air outlet duct 51 does not have an exhaust fan but is directly connected to the air filter housing 31. Air exhaust is provided by an exhaust fan 52 connected to the plenum 32 by an exhaust duct 53, and having an outlet duct 54.

In operating the prior art apparatus a problem was encountered when it was attempted to increase the production rate of the apparatus. As the fiberization rate increased, blow back was encountered and the temperatures in the collection chambers increased and it became difficult to exhaust air through the thicker matte that was on the bottom of the collection chamber floor. This problem was solved by exhausting a part of the air in the collection chamber through an upper vent by means of a cyclone exhaust fan, and vented only part of the air through the floor of the collection chamber. As a result, even though some of the hot gases still vent through the bottom, because a substantial proportion is vented from the top, the gases vented through the bottom do not interfere. Because a small amount of entrained fiber is exhausted from the top of the collection chamber and to the cyclone exhaust fan, the chute 41 is utilized to return the released fibers to the situs where fibers are discharged from the collection chamber. The exhaust gases from the cyclone are driven to the air filter 30 where they are filtered further in the air filter and released to the atmosphere. The fibers carried to the cyclone exhaust fan are released to fall downwardly where they encounter inclined slide or chute 41. The residual fibers conveyed in the ducts 29 and 40 are filtered out on the belt 36 on the filter 30 and are removed intermittently by the conveyor belt 36.

The filter 30 is formed of cement block walls with metal supporting structures, although it can alternatively be formed entirely of metal. The system has a movable floor comprising the belt 36 which is loaded with mineral fiber felt for the filtering media, and the waste gases are filtered through the felt and into the atmosphere. The operation of the belt is intermittent and is moved and advanced as the filter media comprising mineral fiber felt is replaced. The filter 30 comprises a means of removing the small quantities of air borne particulate fiber present in the exhaust gases. The device illustrated is one embodiment, however, any suitable filter including those available commercially work equally well.

The benefits obtained by the use of the present apparatus are that of immediate yield increase. Additionally, the cost of production was reduced and the fiber quality of the fibers recovered from the cyclone mixer were even better than the main normal product returning directly from the collection chambers. As a further improvement, the use of the inclined fiber transport slide or chute enables the fiber returned from the cyclone mixer to be directly returned to the fibers received from the collection chambers and the entire output directly bagged.

It is to be understood that the invention is not to be limited to the exact details of construction or operation or materials shown and described, as obvious modifications and equivalents will be apparent to one skilled in the art.

What is claimed is:

1. An apparatus for forming and collecting mineral fibers, comprising:
   (a) an apparatus for melting mineral slag and producing mineral fibers,
   (b) a collection chamber having an inlet adapted to receive a mixture of air and mineral fibers from said fiber producing apparatus, separating the mineral fibers from the air and depositing the fibers in a packaging area, said collection chamber comprising a housing, a foraminous conveyor means for moving collected mineral fibers out of said chamber mounted below said housing and comprising an endless foraminous belt mounted on rotatable rollers and having an exhaust plenum mounted within said endless belt adapted to exhaust air from said collection chamber through said foraminous belt and thereby reducing the air pressure within said collection chamber, effluent duct means connected to said plenum and means for exhausting air from said effluent duct means,
   (c) a cyclone exhaust apparatus having a duct connected to an upper wall of said collection chamber for exhausting air and mineral fibers therefrom, thereby further reducing the pressure within said chamber, said cyclone exhaust apparatus being adapted to discharge collected mineral fibers therefrom.

2. An apparatus according to claim 1, additionally having a remote filter for collecting discharge waste fibers, said filter having a duct connected to the exhaust from said cyclone exhaust apparatus and a duct connected to the exhaust from said collection chamber.

3. An apparatus according to claim 2, wherein said filter has a foraminous conveyor for separating waste fiber from the air and periodically transporting the collected fiber out of said filter.

4. An apparatus according to claim 1, additionally having an inclined chute having its upper end disposed below the outlet of said cyclone exhaust apparatus and its lower end in the vicinity of said collection chamber for depositing collected fibers in the same area as the fibers discharged from said collection chamber are deposited.

* * * * *